United States Patent
Runge

(10) Patent No.: US 7,252,237 B2
(45) Date of Patent: Aug. 7, 2007

(54) CODE READER

(75) Inventor: Wolfram Runge, Freiburg (DE)

(73) Assignee: Sick AG, Waldkirch (DE)

( * ) Notice: Subject to any disclaimer, the term of this patent is extended or adjusted under 35 U.S.C. 154(b) by 310 days.

(21) Appl. No.: 10/914,865

(22) Filed: Aug. 9, 2004

(65) Prior Publication Data
US 2005/0035203 A1    Feb. 17, 2005

(30) Foreign Application Priority Data
Aug. 12, 2003  (DE) ................ 103 37 329

(51) Int. Cl.
G06K 7/10      (2006.01)

(52) U.S. Cl. .............. 235/462.35; 235/462.22; 235/462.24; 235/462.42

(58) Field of Classification Search .......... 235/462.11, 235/462.17, 462.24, 462.35–42, 462.22
See application file for complete search history.

(56) References Cited

U.S. PATENT DOCUMENTS

| | | | |
|---|---|---|---|
| 4,820,911 A * | 4/1989 | Arackellian et al. ... | 235/462.22 |
| 4,890,924 A | 1/1990 | Beckstein | |
| 5,451,997 A * | 9/1995 | Mochizuki et al. ........ | 347/258 |
| 5,504,317 A | 4/1996 | Takahashi | |
| 6,066,857 A * | 5/2000 | Fantone et al. ............. | 250/566 |
| 6,098,887 A * | 8/2000 | Figarella et al. ....... | 235/472.01 |
| 6,658,140 B1 * | 12/2003 | Hillmann et al. ........... | 382/127 |
| 6,773,142 B2 * | 8/2004 | Rekow ....................... | 362/259 |

FOREIGN PATENT DOCUMENTS

| | | |
|---|---|---|
| DE | 3742485 A1 | 6/1989 |
| DE | 4031633 A1 | 4/1992 |
| DE | 69324298 T2 | 12/1993 |
| DE | 3752296 T2 | 1/1996 |
| DE | 10009493 A1 | 8/2001 |
| WO | WO 01/72028 A1 | 9/2001 |

OTHER PUBLICATIONS

Smith, W.J.; "Anamorphic Systems"; 1966, *Modern Optical Engineering*, McGraw-Hill, pp. 239-241.

* cited by examiner

*Primary Examiner*—Kimberly D. Nguyen
(74) *Attorney, Agent, or Firm*—Townsend and Townsend and Crew LLP

(57) ABSTRACT

A scanner, especially one for the detection of one- and/or two-dimensional codes with a reception optics, projects the image of a reading line onto a linear arrangement of photoreceivers. An illumination arrangement for linearly illuminating an entire reading line has several substantially point-like light sources arranged adjacent to each other in a line. To boost the efficiency of the illumination arrangement, it has at least one anamorphotic illumination optics which forms the light emitted by the light sources into an illumination line.

10 Claims, 3 Drawing Sheets

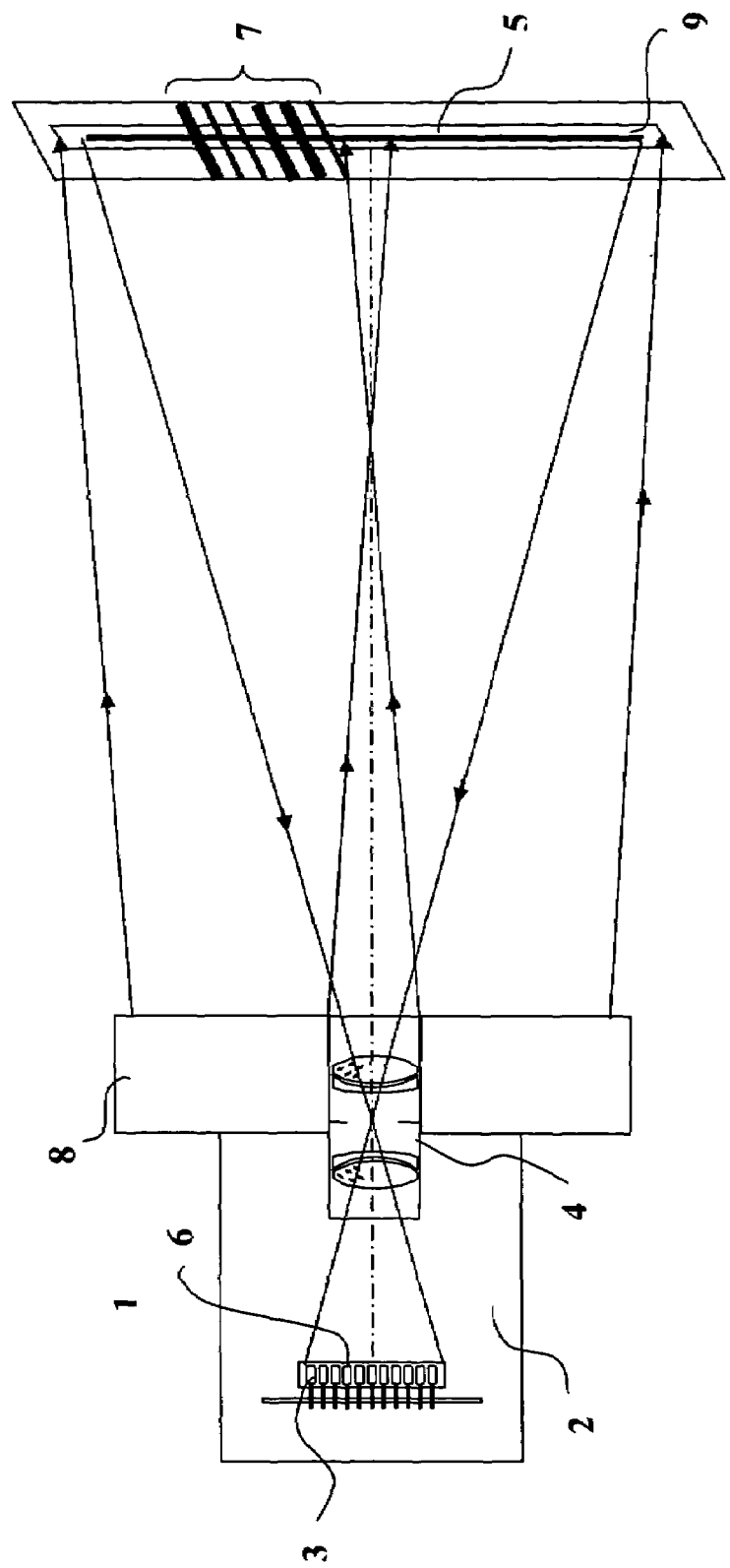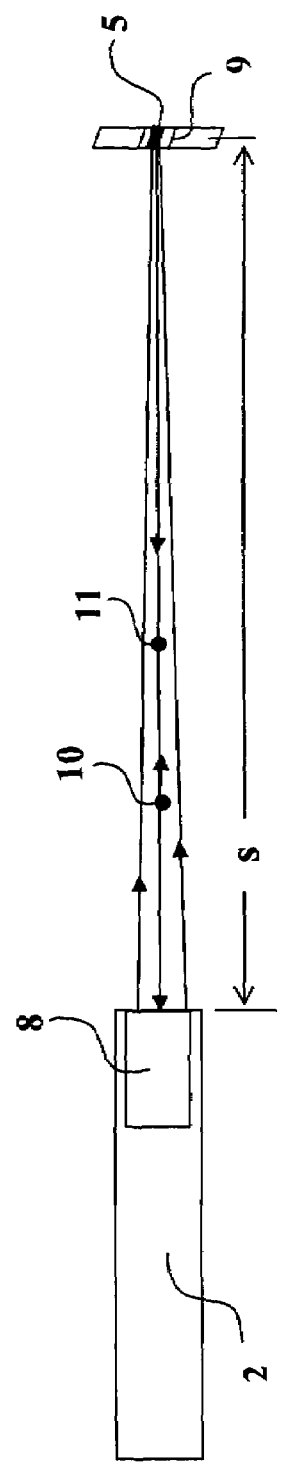
Fig. 3
Fig. 4

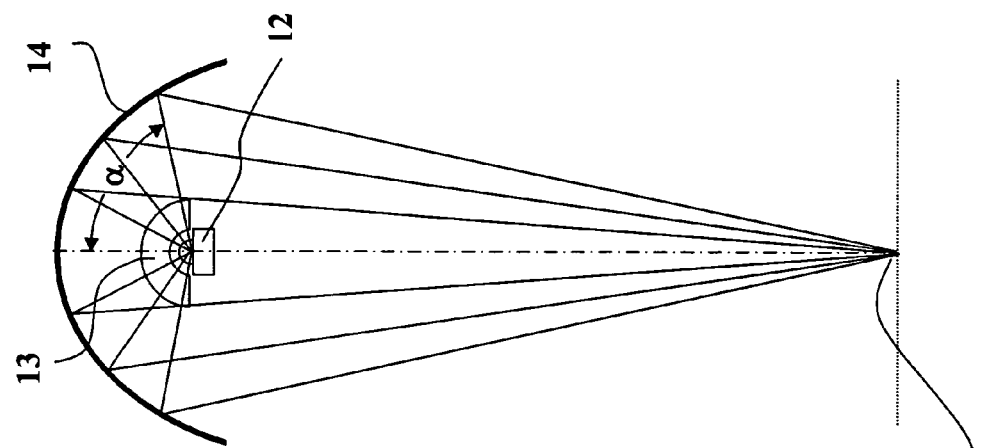
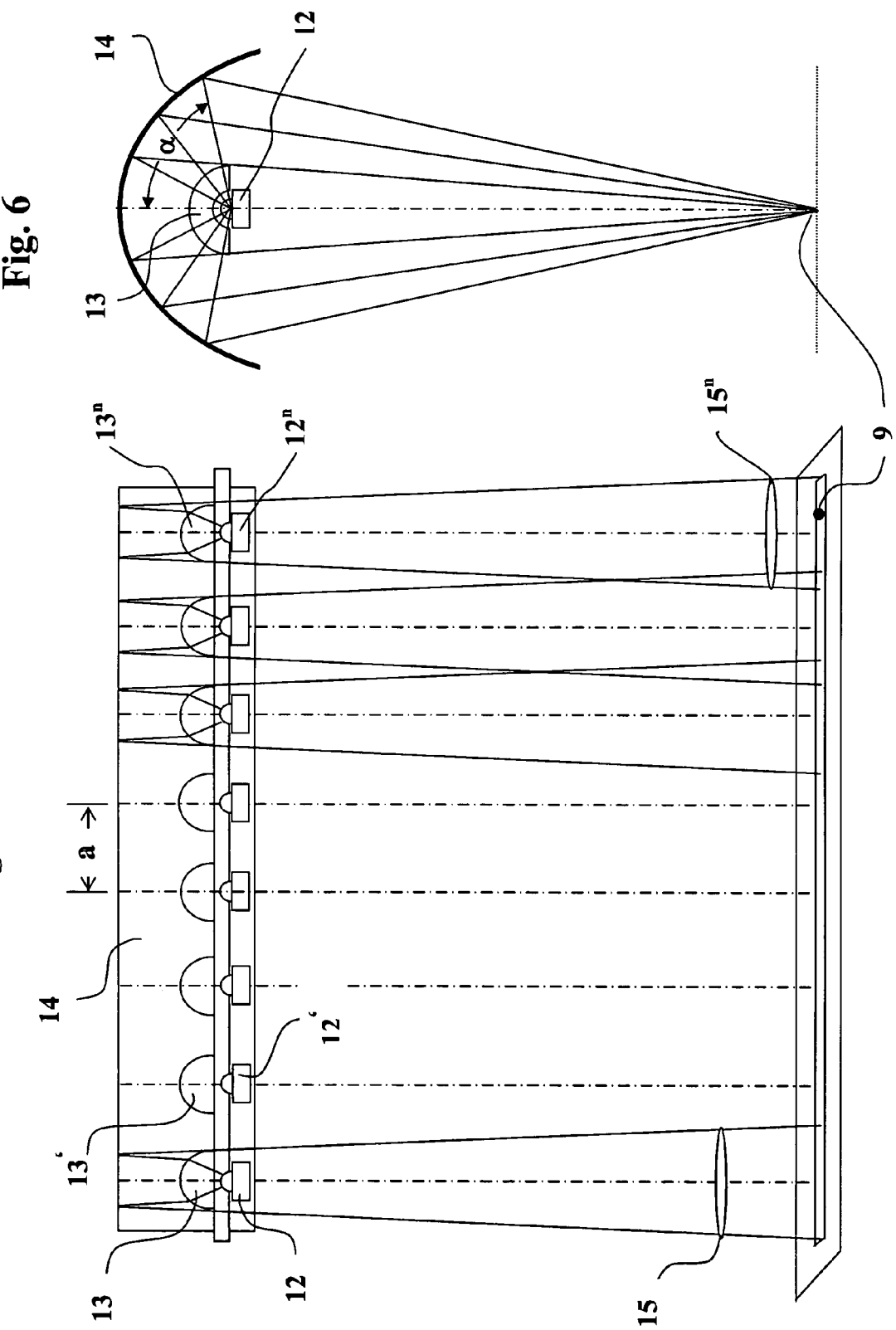

CODE READER

BACKGROUND OF THE INVENTION

The invention concerns a scanner, especially one for the detection of one- and/or two-dimensional codes with a receiving optics that projects the image of a reading line onto a linear array of several photoreceivers, and an illumination arrangement for linearly illuminating the entire reading line.

Such scanners are known, are called line scanners, and can identify unidimensional codes located in the reading line without requiring relative movement between the scanner and the code.

However, if the code moves past the scanner in a transport direction, the scanner can also detect two-dimensional codes as a result of such relative movement.

Scanners operating in this manner often have the drawback that codes are defectively and incompletely identified, or in a worst case not at all, due to inadequate lighting conditions or light intensity along the reading line.

Even when it is feasible to compensate for a low illumination intensity with longer light exposures, a reduced reading speed results. Especially on conveyor lines, a major field of application for such scanners, reduced conveying speeds result, which is a significant disadvantage. In order to lessen this limitation, the codes were illuminated with high-energy light sources, such as sodium vapor lamps, laser diodes, or many diffusely radiating LEDs. This in turn results in a large and expensive scanner with a high electrical power consumption that leads to a significant heating of the scanner.

The term "light" as used in this application is not restricted to visible light. Thus, the word "light" is meant to encompass electromagnetic radiation in general, i.e. UV light, IR light, as well as visible light, which can normally be used for the operation of such scanners.

SUMMARY OF THE INVENTION

It is therefore an object of the invention to enhance the efficiency of the lighting or illumination arrangement with optical means so that a sufficiently high lighting intensity is generated with relatively few light sources that have low energy requirements, which enables a reliable recognition of the codes in the shortest possible time.

The scanner of the present invention has receiving optics that project the image of a reading line onto a line-shaped arrangement of several photoreceivers, and an illumination arrangement, with which the entire reading line is linearly illuminated by several essentially point-like light sources arranged next to each other along a line. According to the invention, the illumination arrangement uses anamorphotic illumination optics to generate a line-shaped illumination line.

A benefit of the illumination arrangement of the present invention is that, due to the use of the special anamorphotic illumination optics, the radiation emitted by the light sources is to a large part concentrated entirely on the illumination line. The high illumination intensity achieved in this way along the illumination line allows for short light exposures and code reading times and also increases the distance between the useful light and undesirable surrounding background light.

In a preferred embodiment the anamorphotic illumination optics is at least a two-stage imaging system. According to the invention, there is a toroidal convex lens with a short focal length in the immediate vicinity of each individual light source for beam formation in the meridional plane and, at a greater distance, a refractive cylindrical lens with a long focal length that receives the light from all light sources and influences the beam formation in the sagittal plane. It is advantageous for the short focal length toroidal convex lens to have an aspherical contour in its meridional cross-section, because this improves the aperture ratio and/or reduces spherical aberrations.

It is advantageous to form the second long focal length refractive cylindrical lens, which determines the beam guidance for all light sources in the sagittal plane, as a hollow cylindrical mirror with a circular or parabolic cross-section. In this way, especially when using a mirror with a parabolic cross-section, the optically effective aperture of the cylindrical mirror relative to its focal length can be increased to more than 1:0.5, which corresponds to a numerical aperture of more than 1.

Thus, it becomes possible to concentrate a majority of the radiation from all the light sources onto the illumination line with a simple optical component.

It is especially advantageous when the optical components of the anamorphotic illumination optics are at least partly diffractive optical elements or are produced as Fresnel lenses using injection molding or embossing techniques.

Another advantage of the invention is that the overall length of the illumination line can be varied over a wide range for a given number and the spatial density of the light sources, together with the short focal length toroidal convex lenses.

A further advantage is that the illumination line generated by the individual light sources can be given a substantially homogeneous, longitudinal illumination intensity by appropriately selecting the spatial density of the light sources and optimizing the dimensioning of the short focal length toroidal convex lenses so that the partial illumination lines generated by the individual light sources overlap.

An advantage of the two-stage anamorphotic illumination optics of the present invention is that the width of the illumination line can be selected with the projection scale of the cylindrical optics operating in the sagittal plane. In this way, the illumination line can be optimally adapted to the width of the reading line of the scanner.

According to an especially preferred embodiment, the individual short focal length toroidal convex lenses associated with the light sources for the beam formation in the meridional plane are configured as a single-piece lens array which can be economically produced. Thus, several LEDs, which are arranged on one line at defined spacings, for example, on a circuit board, can be assembled with the short focal length toroidal convex lenses in a single production step.

BRIEF DESCRIPTION OF THE DRAWINGS

FIG. 3 is a schematic top view of a scanner with a coplanar illumination arrangement, FIG. 4 is a side view of the scanner of FIG. 3, FIG. 5 is a section through the anamorphotic illumination optics in the meridional plane, and FIG. 6 is a section in the sagittal plane through the anamorphotic illumination optics.

DESCRIPTION OF THE PREFERRED EMBODIMENTS

Figure 1:
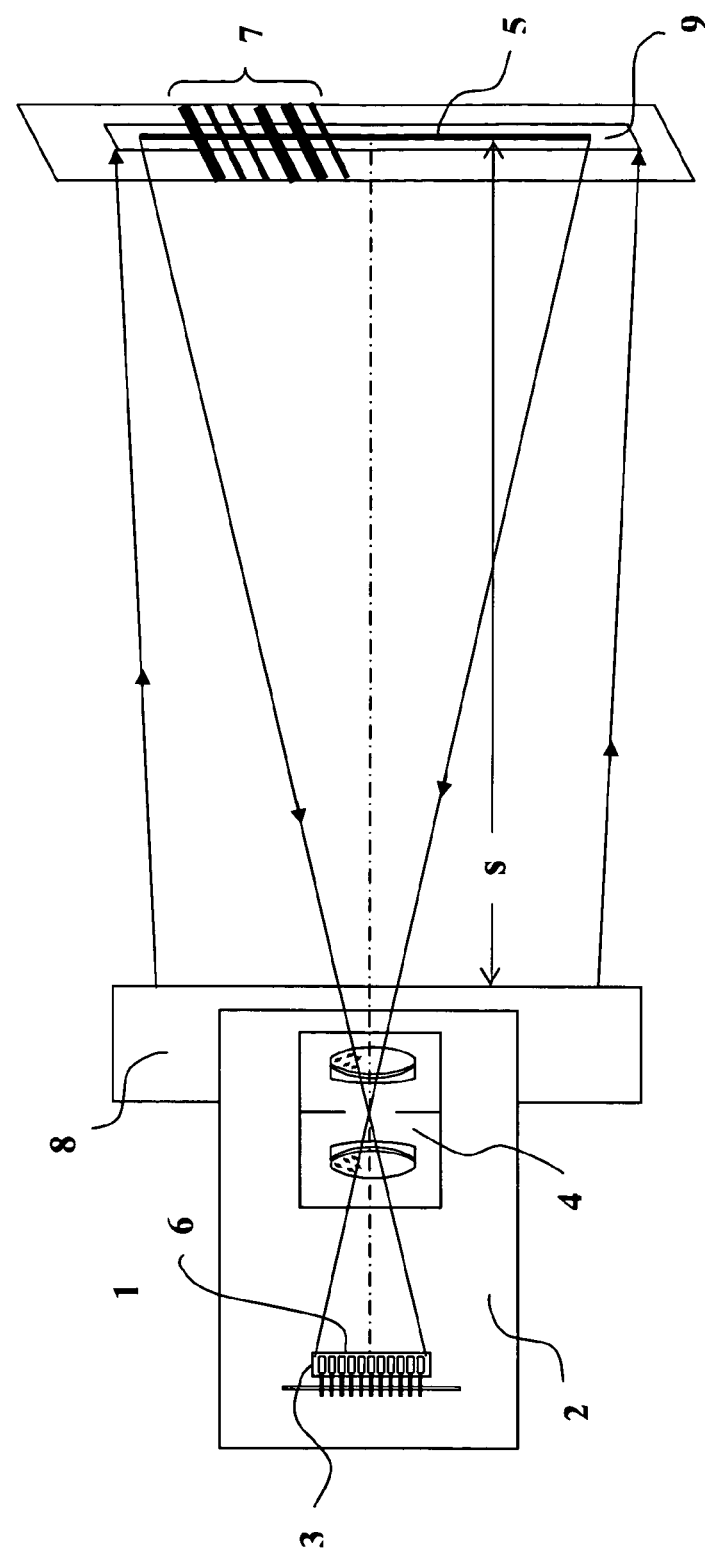
FIG. 1 is a schematic top view of a scanner with the illumination arrangement of the invention arranged in a V configuration.

Referring to FIG. 1, a scanner 1 in a housing part 2 has a line-shaped array of several photoreceivers 3. The array of photoreceivers 3 is configured as a position-resolving detector, in particular a CCD line or CMOS line. Receiving optics 4, also installed in housing part 2, projects an image of a reading line 5, which is spaced from the scanner by a reading distance "s", onto a surface 6 of the array of photoreceivers 3. Thus, a code 7, consisting of differently reflecting contrast marks, will cause the individual photoreceivers to generate different photocurrents, so that the information contained in the code can be detected in an evaluation unit.

A quick and reliable evaluation of the different photocurrents generated by the individual photoreceivers requires a high illumination intensity on reading line 5. For this, several substantially point-like light sources are located in another housing part 8. The emitted light illuminates an illumination line 9 with the anamorphotic illumination optics of the present invention.

Figure 2:
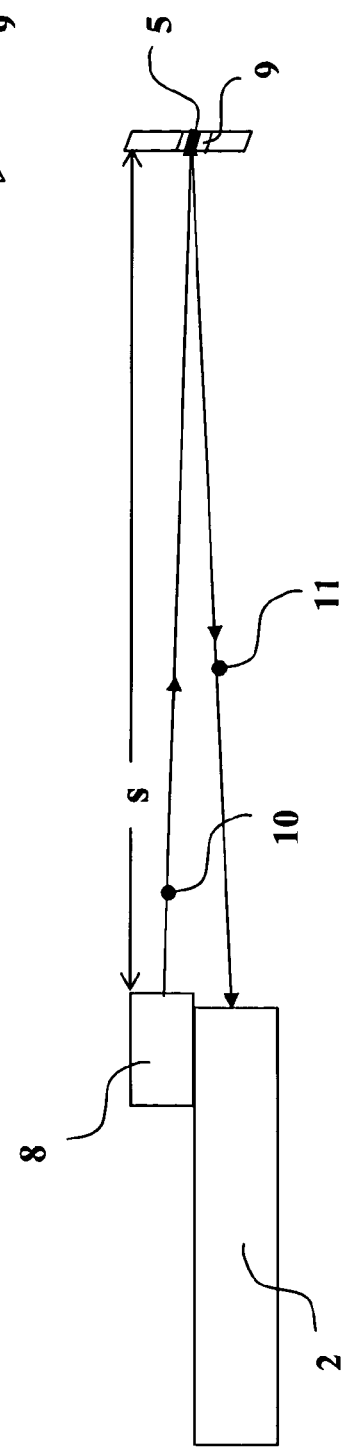
FIG. 2 is a side view of the scanner of FIG. 1.

Referring to FIG. 2, reading line 5 and illumination line 9 overlap at the reading distance "s". This is achieved in that an optical axis 10 of the illumination optics forms an angle with an optical axis 11 of the reception optics in the meridional plane. If the scanner in such a V-shaped configuration operates at the fixed reading distance "s", the housing parts 2 and 8 can be firmly joined together, or can form a single, common housing for both.

However, to allow for adjustments of the reading distance "s" between the scanner and reading line 5, housing part 2 for the reception optics and the photoreceivers and housing part 8 for the light sources and the anamorphotic illumination optics of the invention can be movably connected so that the relative angular positions of the housing parts can be varied.

If a given installation does not permit such a V-shaped configuration, the illumination and the light reception arrangements can be autocollimated, for example, by using a mirror (not shown) which partially reflects and partially transmits the light.

FIG. 3 shows a preferred embodiment of the scanner, in which the anamorphotic illumination optics installed in housing part 8 is coplanar with photoreceivers 3 and reception optics 4.

The advantage of a coplanar arrangement, especially at varying reading distances "s", is best seen in FIG. 4. Since optical axis 10 of the illumination optics and optical axis 11 of the reception optics lie in the same meridional plane, there is a symmetry between reading line 5 and illumination line 9 over a large reading distance "s".

Referring to FIG. 5, which shows a cross-section through the anamorphotic illumination optics in the meridional plane, there are several substantially point-like light sources 12, 12' to 12", such as LEDs, which are linearly arranged and displaced from each other by the distance "a". Light is focused in the meridional plane by each short focal length toroidal convex lens 13, 13' to 13" such that the beams in this plane diverge only slightly. The toroidal convex lenses 13, 13' to 13" can be produced as a single piece in a plastic injection mold or they can be press-formed as a single glass piece, which simplifies the adjustment and mounting of the illumination optics. After one beam deflection at a hollow cylindrical mirror 14 that extends over all light sources 12, 12' to 12", the individual partial beams 15 to 15" are directed onto illumination line 9. Due to the divergence of the individual partial beams 15 to 15" caused by toroidal convex lenses 13, 13' to 13", the partial illumination lines overlap in the plane of the illumination line 9 so that, despite the essentially Gaussian energy distribution of the partial illumination lines, the result is a combined illumination line 9 with nearly constant energy distribution.

FIG. 6 shows in the sagittal cross-section of the anamorphotic illumination optics, in a direction perpendicular to FIG. 3, a point-like light source 12, as well as the cross-section of a toroidal convex lens 13. It will be observed that, in a first approximation, this is a curved disk of constant middle thickness which has only a slight optical refractive power. For this reason, the radiation of the light sources will impinge on the surface of the hollow cylindrical mirror 14 without appreciably changing direction. The hollow cylindrical mirror 14 is dimensioned so that the radiation it reflects in the sagittal plane is focused on illumination line 9.

The width of the illumination line 9 produced at the focus can thus be influenced via the focal length of the cylindrical optics as well as the focal intercepts at the object and image side.

If a high numerical aperture is selected, i.e. when the sine of the aperture half-angle $\alpha$ approaches 1, it is of advantage to provide the circular cross-section of the hollow cylindrical mirror 14 with a parabolic contour.

The optical function of the hollow cylindrical mirror 14 can also be attained with a continuous planar, concave or biconvex cylindrical lens. In such case, the beam paths from light sources 12, 12' to 12" undergo no reversal on their way to illumination line 9, but the length of the illumination optics may thereby be increased.

The invention claimed is:

1. A scanner for detecting one-and/or two-dimensional codes comprising a reception optics that directs an image of a reading line onto a line-shaped arrangement of a plurality of photoreceivers, and an illumination arrangement for linearly illuminating the reading line including a plurality of substantially point-like light sources arranged adjacent to each other along a line and at least one anamorphotic illumination optics which transforms light emitted by the light sources into an illumination line, the anamorphotic illumination optics comprising an at least two-stage projection system having a short focal length toroidal convex lens in a vicinity of each light source forming a light beam in a meridional plane, and a common long focal length refractive cylindrical lens acting in a sagittal plane.

2. A scanner according to claim 1, wherein the long focal length projection system acting in the sagittal plane includes a hollow cylindrical mirror having one of a round cross-section and a parabolic cross-section.

3. A scanner according to claim 1, wherein the anamorphotic illumination optics has a high numerical aperture in at least one of the meridional plane and the sagittal plane.

4. A scanner according to claim 1, wherein the short focal length toroidal convex lens of the anamorphotic illumination optics has an aspherical contour in a meridional cross-section.

5. A scanner according to claim 1, wherein the anamorphotic illumination optics include at least partly diffractive optical elements.

6. A scanner according to claim 5, wherein the diffractive optical elements comprise a Fresnel lens.

7. A scanner according to claim 1, wherein an overall length of the illumination line is adjustable by varying a number and a spatial density of the light sources and the short focal length toroidal convex lenses.

8. A scanner according to claim 7, wherein a spatial density of the light sources and a dimensioning of the short focal length toroidal convex lenses are selected so that an illumination intensity in a lengthwise direction of the illumination line is substantially homogeneous.

9. A scanner according to claim 1, wherein a width of the illumination line can be varied by varying a projection scale of the cylindrical lens acting in the sagittal plane.

10. A scanner according to claim 1, wherein the anamorphotic illumination optics comprises a single-piece lens array in the meridional plane.

* * * * *